United States Patent
Sakurada et al.

(10) Patent No.: US 10,112,332 B2
(45) Date of Patent: Oct. 30, 2018

(54) HEATING DEVICE OF INJECTION MOLDING MACHINE

(71) Applicant: NISSEI PLASTIC INDUSTRIAL CO., LTD., Hanishina-gun, Nagano-ken (JP)

(72) Inventors: Yuichi Sakurada, Nagano-ken (JP); Toshimi Kato, Nagano-ken (JP); Keiichi Tozawa, Nagano-ken (JP)

(73) Assignee: NISSEI PLASTIC INDUSTRIAL CO., LTD., Hanishina-Gun, Nagano-Ken (JP)

(*) Notice: Subject to any disclaimer, the term of this patent is extended or adjusted under 35 U.S.C. 154(b) by 253 days.

(21) Appl. No.: 14/922,821

(22) Filed: Oct. 26, 2015

(65) Prior Publication Data
US 2016/0114511 A1  Apr. 28, 2016

(30) Foreign Application Priority Data
Oct. 27, 2014 (JP) ................. 2014-218620

(51) Int. Cl.
*B29C 45/74* (2006.01)
*B29K 101/12* (2006.01)

(52) U.S. Cl.
CPC .......... *B29C 45/74* (2013.01); *B29K 2101/12* (2013.01)

(58) Field of Classification Search
CPC .................................................. B29C 45/74
See application file for complete search history.

(56) References Cited

U.S. PATENT DOCUMENTS 4,687,613 A * 8/1987 Tsutsumi ............ B29C 45/2737
264/328.15
6,486,445 B1 * 11/2002 Pendergraft ............ B29C 45/74
219/422

FOREIGN PATENT DOCUMENTS

JP         3007990 U     2/1995
JP         11-115015 A   4/1999

\* cited by examiner

*Primary Examiner* — Ryan M Ochylski
(74) *Attorney, Agent, or Firm* — Birch, Stewart, Kolasch & Birch, LLP

(57) ABSTRACT

When a heating device is formed which includes at least one or more heaters 4n, 4a, 4b, 4c and 4d that are provided on the outer circumferential surfaces 2f and 3f of at least one of a heating cylinder 2 and an injection nozzle 3 to heat at least one of the heating cylinder 2 and the injection nozzle 3, at least some heaters 4a, 4b, 4c, . . . of all the heaters 4n, 4a, . . . are formed with air cooling-capable heaters 4as, 4bs and 4cs in which a panel member 5 formed of a material R having thermal conductivity is interposed between the heaters 4a, 4b, 4c, . . . and the outer circumferential surfaces 2f and 3f of at least one of the heating cylinder 2 and the injection nozzle 3, in which an air path 6 for air cooling is formed in the panel member 5 and in which an air outlet and inlet portion 8 allowing air A to be passed from an air supply portion 7 is provided in the air path 6.

13 Claims, 7 Drawing Sheets

HEATING DEVICE OF INJECTION MOLDING MACHINE

TECHNICAL FIELD

This invention relates to a heating device of an injection molding machine including a heater that is provided on the outer circumferential surface of a heating cylinder or the like to heat the heating cylinder or the like.

BACKGROUND ART

In general, an injection molding machine includes an injection device that injects a molten resin into a mold. In this case, in the injection device, a heating cylinder having an injection nozzle at a front end and a hopper at a back portion is included, a screw is inserted through the interior of the heating cylinder and a heating device (heater) is provided on the outer circumferential surface of the heating cylinder. In this way, a solid pellet supplied from the hopper into the heating cylinder is plasticized and kneaded through shearing produced by the rotation of the screw and heating produced by the heating cylinder, and thus the molten resin to be injected into the mold is generated. On the other hand, in terms of the multi-functionality of the heating device, a heating device is also proposed to which in addition to a general heating function, a forced cooling function is added.

Conventionally, as the heating device of an injection molding machine to which such a cooling function is added, a temperature control structure that is disclosed in patent literature 1 and that is preset in the back portion of the heating cylinder of the injection molding machine and a temperature control device that is disclosed in patent literature 2 and that is present in a heating cylinder having a heat retention cover-equipped heater are known. The temperature control structure that is disclosed in patent literature 1 and that is preset in the back portion of the heating cylinder of the injection molding machine has the purpose of making it possible to cool the temperature control on the back portion of the heating cylinder, thereby obtaining the same effect as that produced by the shortening of the heating cylinder and reducing the thermal history time of the raw material resin so as to prevent the physical properties from being degraded and to avoid a material biting failure and the insufficiency of a screw rotation torque. Specifically, between a heater for heating in the back portion of the heating cylinder and the heating cylinder, a cooling pipe is provided by being wound, and thus cooling water is passed.

The temperature control device that is disclosed in patent literature 2 and that is present in the heating cylinder having the heat retention cover-equipped heater has the purpose of reducing the amount of heat discharged from the heater and rapidly lowering the temperature of the heating cylinder. Specifically, a heat retention cover in which a heat retention material having a ventilation property is lined is attached to the outer wall surface of the heater attached to the heating cylinder, a half member in which a heat retention material is lined is coupled by a hinge portion to the heat retention cover so as to be freely opened and closed and when a tightening bolt screwed to a boss portion is tightened at the time of the attachment to the outer wall surface of the heater, both the half members are made to communicate with each other on the mating surface to form a ventilation path. Then, an inlet is provided in one of the half members, an outlet is provided in the other half member, a fan provided in the outlet is rotated to discharge air through the outlet, outside air is sucked through the inlet and thus air-cooling is performed.

SUMMARY OF INVENTION

Technical Problem

However, the conventional heating device to which the above-described cooling function disclosed in patent literatures 1 and 2 is added has the following problems.

Disadvantageously, in the configuration which is disclosed in patent literature 1 and in which the cooling pipe is provided by being wound between the heater for heating and the heating cylinder to pass the cooling water, a heating structure is basically sacrificed. Specifically, since in the heating structure, heat in the heater for heating is transmitted to the heating cylinder to heat the heating cylinder, a member (cooling pipe) that inhibits the thermal conductivity is interposed between the heater for heating and the heating cylinder, and thus a heat loss is increased and the efficiency of heating is significantly lowered, with the result that the responsiveness and controllability of the temperature control are lowered. Hence, it is not suitable for the applications of materials such as a thermoplastic resin that need to be actively melted.

On the other hand, by contrast, in the configuration which is disclosed in patent literature 2 and in which air is blown by the fan to the heater provided on the outer circumferential surface of the heating cylinder from the outside of the heater, since the heater is interposed between the fan and the heating cylinder, the air-cooling action is inhibited to significantly lower the efficiency of air cooling. Moreover, for example, it is necessary to arrange the fan in the vicinity of the heating cylinder, and thus the size of a molding facility is uselessly increased and the space efficiency is lowered.

Eventually, in the structure in which the heater is provided on the outer circumferential surface of the heating cylinder, and thus heat generated by the heater is directly transmitted to the heating cylinder to heat the heating cylinder, it is not easy to sufficiently achieve both the heating function and the cooling function, and one of them is inevitable sacrificed.

This invention has an object to provide a heating device of an injection molding machine that solves the problems present in the background art described above.

Solution to Problem

In order to solve the problems described above, in the heating device 1 of the injection molding machine M according to this invention, when the heating device is formed which includes at least one or more heaters 4n, 4a, 4b, 4c and 4d that are provided on the outer circumferential surfaces 2f and 3f of at least one of a heating cylinder 2 and an injection nozzle 3 to heat at least one of the heating cylinder 2 and the injection nozzle 3, at least some heaters 4a, 4b, 4c, . . . of all the heaters 4n, 4a, . . . are formed with air cooling-capable heaters 4as, 4bs and 4cs in which a panel member 5 formed of a material R having thermal conductivity is interposed between the heaters 4a, 4b, 4c, . . . and the outer circumferential surfaces 2f and 3f of at least one of the heating cylinder 2 and the injection nozzle 3, in which an air path 6 for air cooling is formed in the panel member 5 and in which an air outlet and inlet portion 8 allowing air A to be passed from an air supply portion 7 is provided in the air path 6.

Advantageous Effects of Invention

Hence, in the heating device 1 of the injection molding machine M according to this invention, the following significant effects are achieved.

(1) At least some heaters 4a, 4b, 4c, . . . of all the heaters 4n, 4a, . . . are formed with air cooling-capable heaters 4as, 4bs and 4cs in which a panel member 5 formed of a material R having thermal conductivity is interposed between the heaters 4a, 4b, 4c, . . . and the outer circumferential surfaces 2f and 3f of at least one of the heating cylinder 2 and the injection nozzle 3, in which an air path 6 for air cooling is formed in the panel member 5 and in which an air outlet and inlet portion 8 allowing air A to be passed from an air supply portion 7 is provided in the air path 6, with the result that a heating structure of the heaters 4a, . . . is hardly sacrificed. Hence, it is possible to minimize a decrease in heat loss (heating efficiency) and furthermore, a decrease in the responsiveness of the temperature control and a decrease in controllability, and thus it is possible to sufficiently achieve both the heating function and the cooling (air-cooling) function.

(2) Even when a cooling structure is added to the heater 4a provided on the outer circumferential surface 2f of the heating cylinder 2, since it is not necessary to change the outside diameter of the heater 4a, it is possible to avoid a failure in which the side of the heating cylinder 2 and hence the injection molding machine M is increased. In other words, even when a cooling structure is added to the already provided heating structure, it is possible to avoid a failure in which the size of a molding facility is uselessly increased and the space efficiency is lowered.

(3) In the preferred aspect, the heaters 4n, 4a, . . . incorporate a heating member 12 therewithin and uses a band heater 11 that is fitted by being wound on the outer circumferential surfaces 2f and 3f of at least one of the heating cylinder 2 and the injection nozzle 3, and thus it is possible to practice the optimum form combined with the attachment structure (heating structure) of the band heater 11 which conducts heat by surface contact to the outer circumferential surfaces 2f and 3f of the heating cylinder 2 and/or the injection nozzle 3.

(4) In the preferred aspect, when the thermally conductive metal material Rm is used as the material R having thermal conductivity, since it is possible to utilize a stainless plate or the like having satisfactory thermal conductivity, flexibility and processability, an air-cooling action and a heating action necessary for materials are acquired, and it is possible to practice the optimum form in terms of acquiring satisfactory manufacturability and fitting property.

(5) In the preferred aspect, since the panel member 5 is formed with at least one or more panel members 5s, 5a, 5b . . . , in particular, a plurality of panel members 5a, 5b, in which different path portions are formed can be combined, the flexibility of the design is enhanced, with the result that various air paths 6 can be easily formed. In this way, it is possible to easily optimize the air path 6 corresponding to the dimensions of the heating cylinder 2.

(6) In the preferred aspect, the panel members 5a, 5b, . . . are formed by being punched to form the air path 6 with the slits 61, 62i, 62e, 65p and 65q, and thus the air path 6 can be provided by a simple manufacturing process having a small number of steps, with the result that the intended panel member 5 can be obtained easily and inexpensively.

(7) In the preferred aspect, the thicknesses of the panel members 5a, 5b, . . . are made to fall within a range of 0.5 to 2 mm, and thus in terms of not only the selection of the material or the like but also the thickness of layers, it is possible to effectively acquire necessary thermal conductivity, flexibility and processability.

(8) In the preferred aspect, the air cooling-capable heaters 4as, 4bs and 4cs are applied to at least one or two or more heaters 4a, 4b and 4c that heat the metering zone Zm, the compression zone Zc and the feeding zone Zf in the heating cylinder 2, and thus by the air-cooling functions of the air cooling-capable heaters 4as, 4bs and 4cs, in particular, it is possible to reduce a unnecessary temperature increase in a portion where shear heat is generated when a resin material is sheared by the rotation of the screw. In this way, it is possible to realize satisfactory temperature control and to contribute to further enhancement of molding quality.

(9) In the preferred aspect, the heat retention cover 13 using the heat insulation material Rs is provided on the outer circumferential surfaces of the air cooling-capable heaters 4as, 4bs and 4cs, and thus, it is possible to sufficiently achieve the original purpose of the heat retention cover 13. Specifically, although in general, the heat retention cover 13 is prepared, for example, as an option or the like so as to retain the heat of the heating cylinder 2 and thereby enhance energy saving, since a negative effect such as the lowering of controllability of a cooling direction is produced, some users do not adopt the heat retention cover 13 or remove the heat retention cover 13 after it is fitted. However, since the air cooling-capable heaters 4as, 4bs and 4cs of this invention are adopted, and thus it is possible to remove the negative effect caused by the heat retention cover 13, the effectiveness of the heat retention cover 13 is achieved, with the result that it is possible to enhance energy saving.

DESCRIPTION OF EMBODIMENTS

A detailed description will then be given using a preferred embodiment according to this invention with reference to drawing. The accompanying drawings are not intended to specify this invention but are intended to facilitate the understanding of this invention. The detailed description of known portions will be omitted so that the obscurity of the invention is avoided.

The configuration of a heating device 1 of an injection molding machine M according to this embodiment will first be described with reference to FIGS. 1 to 7.

Figure 2:
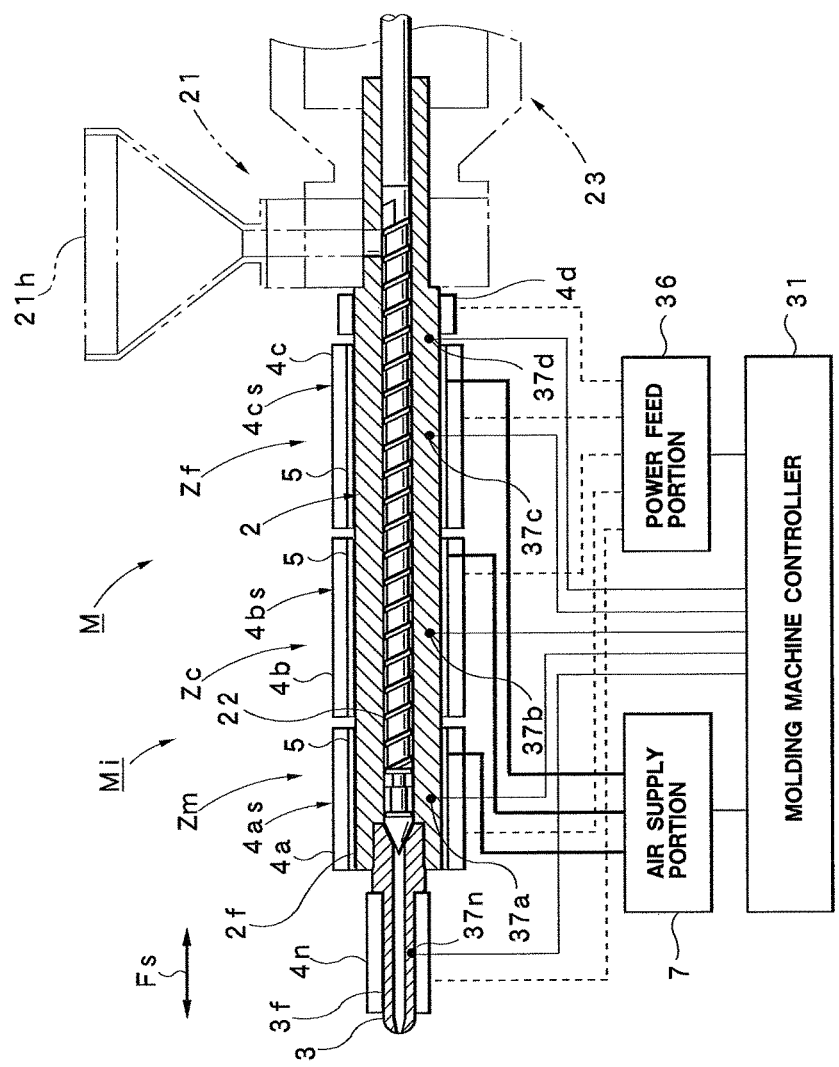
FIG. 2: A system diagram of the entire control system including a cross-sectional side view of an injection device in the injection molding machine including the heating device.

In FIG. 2, Mi represents an injection device, and the injection device Mi and an unillustrated mold clamping device form the injection molding machine M. The injection device Mi includes a heating cylinder 2, the heating cylinder 2 has an injection nozzle 3 at a front end and the back end of the heating cylinder 2 is coupled to a material supply portion 21 having a hopper 21h for supplying a molding material into the heating cylinder 2. A screw 22 is inserted into the heating cylinder 2, the back end of the screw 22 is extended out to the back of the material supply portion 21 and thus the screw 22 is connected to a screw drive portion 23 which is driven to rotate and is driven to move forward and backward and whose detailed drawing is omitted.

Then, on the outer circumferential surface 2f of the heating cylinder 2 and the outer circumferential surface 3f of the injection nozzle 3, the heating device 1 of this embodiment is provided. The heating device 1 includes heaters 4n, 4a, 4b, 4c and 4d that are sequentially provided along an axial direction Fs. Specifically, the heating device 1 includes the heater 4n fitted on the outer circumferential surface of the injection nozzle 3 (nozzle zone), the heater 4a fitted to the front portion (metering zone Zm) of the heating cylinder 2, the heater 4b fitted to the intermediate portion (compression zone Zc) of the heating cylinder 2, the heater 4c fitted to the back portion (feeding zone Zf) of the heating cylinder 2 and the heater 4d fitted to the final portion of the heating cylinder 2.

In this case, the heater 4n fitted to the outer circumferential surface 3f of the injection nozzle 3 incorporates a heating member 12 therewithin, and uses a band heater 11 (see FIG. 1) fitted by being wound around the outer circumferential surface 3f of the injection nozzle 3 without the band heater 11 being processed. In other words, the heater 4n is formed as a normal heating portion using the band heater 11. Likewise, the heater 4d fitted to the final portion of the heating cylinder 2 incorporates the heating member 12 therewithin, uses the band heater 11 (see FIG. 1) fitted by being wound around the outer circumferential surface 2f of the heating cylinder 2 without the band heater 11 being processed and is formed as a normal heating portion.

On the other hand, the heaters 4a, 4b and 4c that heat the metering zone Zm, the compression zone Zc and the feeding zone Zf in the heating cylinder 2 are respectively formed as air cooling-capable heaters 4as, 4bs and 4cs serving as the main portions of this invention. As described above, the air cooling-capable heaters 4as, 4bs and 4cs are applied to at least one or two or more heaters 4a, 4b and 4c that heat the metering zone Zm, the compression zone Zc and the feeding zone Zf in the heating cylinder 2, and thus by the air-cooling functions of the air cooling-capable heaters 4as, 4bs and 4cs, in particular, it is possible to reduce a unnecessary temperature increase in a portion where shear heat is generated when a resin material is sheared by the rotation of the screw. In this way, it is advantageously possible to realize satisfactory temperature control and to contribute to further enhancement of molding quality.

The configuration of the air cooling-capable heater 4as will be specifically described below. In the basic configuration of the air cooling-capable heater 4as, a panel member 5 formed of a material R having thermal conductivity is interposed between the heater 4a and the outer circumferential surface 2f of the heating cylinder 2, an air path 6 for air cooling is formed in the panel member 5 and in the air path 6, an air outlet and inlet portion 8 that allows air A to be passed from an external air supply portion 7.

Figure 4:
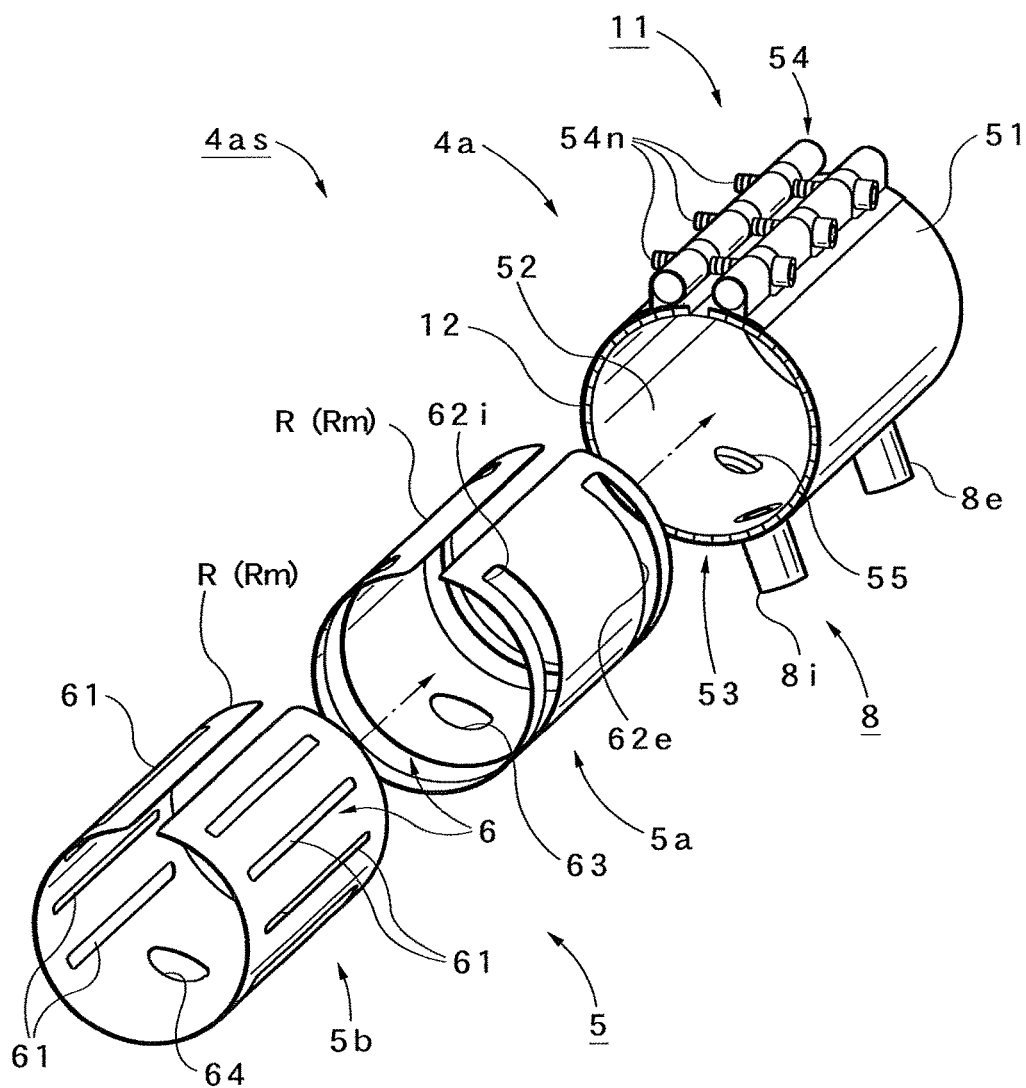
FIG. 4: An exploded perspective view showing the appearance of the constituent components of the heating device.

In this case, in the heater 4a, as with the heaters 4n and 4d described above, the band heater 11 is used that incorporates the heating member 12 therewithin and that is fitted by being wound on the outer circumferential surface 2f of the heating cylinder 2. In the band heater 11, as shown in FIG. 4, the heating member 12 is sandwiched between a rectangular outer panel portion 51 and a rectangular inner panel portion 52 to form the entire member as a flexible band-shaped member 53, and both ends of the band-shaped member 53 in the longitudinal direction (circumferential direction) can be coupled with a coupling portion 54. The coupling portion 54 includes a plurality of coupling screws 54n, and as shown in FIG. 4, the coupling screws 54n are inserted into an insertion hole portion provided at one end in the longitudinal direction of the band-shaped member 53, and are thereafter screwed to a nut portion provided at the other end in the longitudinal direction. Since the coupling portion 54 uses the coupling screws 54n to perform the coupling, the coupling portion 54 has not only the function of coupling both ends in the longitudinal direction of the band-shaped member 53 but also has a removable function capable of removal and furthermore the function of adjusting the magnitude (the absolute magnitude and the relative magnitude in the position in the axial direction) of the tightening strength. As described above, as the heater 4a, the band heater 11 is used, and thus it is advantageous to practice the optimum form combined with the attachment structure (heating structure) of the band heater 11 which conducts heat by surface contact to the outer circumferential surfaces 2f and 3f of the heating cylinder 2 and/or the injection nozzle 3. Reference numeral 55 represents a sensor insertion hole provided in the band-shaped member 53.

On the other hand, in the panel member 5, as the material R having thermal conductivity, a thermally conductive metal material Rm is used. As the thermally conductive metal material Rm, a stainless material is preferable. When as described above, the thermally conductive metal material Rm is used as the material R, since it is possible to utilize a stainless plate or the like having satisfactory thermal conductivity, flexibility and processability, an air-cooling action and a heating action necessary for materials are acquired, and it is advantageous to practice the optimum form in terms of acquiring satisfactory manufacturability and fitting property.

Figure 5:
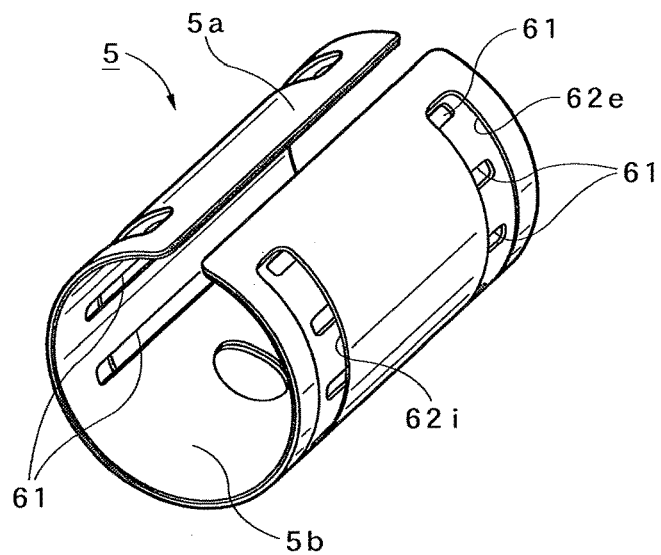
FIG. 5: An external perspective view of a panel member used in a cooling structure included in the heating device.
Figure 7:
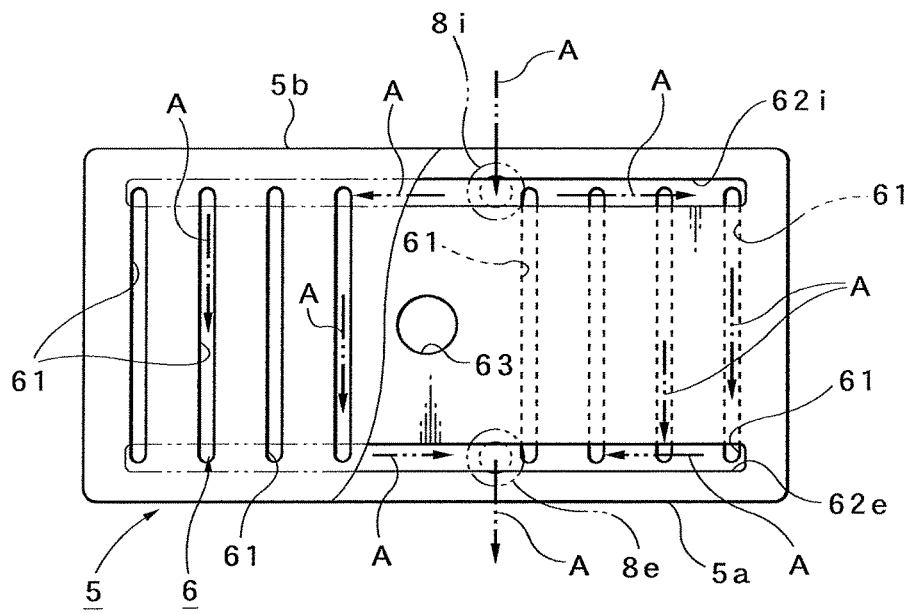
FIG. 7: A partially cutaway development view showing a state where the panel member included in the heating device is unfolded when seen in the direction of a bottom surface.

In the panel member 5, as shown in FIGS. 4, 5 and 7, two panel members 5a and 5b, that is, a first panel member 5a and a second panel member 5b are prepared, and the two panel members 5a and 5b are overlaid to form the panel member 5. When as described above, the two panel members 5a and 5b are overlaid to achieve the configuration, since in particular, two (in general, a plurality of) panel members 5a and 5b in which different path portions are formed can be combined, the flexibility of the design is enhanced, with the result that various air paths 6 can be easily formed. In this way, it is advantageous to easily optimize the air path 6 corresponding to the dimensions of the heating cylinder 2. Preferably, the sizes of the first panel member 5a and the second panel member 5b are made substantially equal to that of the inner panel portion 52 of the band heater 11 described previously, and the thicknesses thereof are made to fall within a range of 0.5 to 2 mm (in the illustration, 1 mm). In this way, in terms of not only the selection of the material or the like but also the thickness of layers, it is possible to effectively acquire necessary thermal conductivity, flexibility and processability.

As shown in FIGS. 4 and 7, in the second panel member 5b, a plurality of (in the illustration, eight) slits 61 serving as the path portions along the direction of the short side (the axial direction Fs) are formed by being punched a predetermined distance apart in the longitudinal direction, and in the first panel member 5a, two slits 62i and 62e serving as the path portions along the longitudinal direction are formed by being punched on both sides in the direction of the short side. In this way, as shown in FIG. 7, when the first panel member 5a and the second panel member 5b are overlaid, the slit 62i on one side serves as the inlet side of air and communicates with the side of one ends of the slits 61, and the slit 62e on the other side serves as the outlet side of air, with the result that the intended air path 6 communicating with the side of the other ends of the slits 61 is formed. In this way, the panel members 5a and 5b are formed by being punched to form the air path 6, and thus the air path 6 can be provided by a simple manufacturing process having a small number of steps, with the result that the intended panel member 5 can be obtained easily and inexpensively. The width, the interval, the shape and the like of the slits 61, 62i and 62e can be arbitrarily selected according to the cooling target and the like. Reference numbers 63 and 64 in the figure represent the sensor insertion holes formed in the panel members 5a and 5b. The positions of the sensor insertion holes 63 and 64 coincide with the position of the sensor insertion hole 55 provided in the band heater 11.

Figure 1:
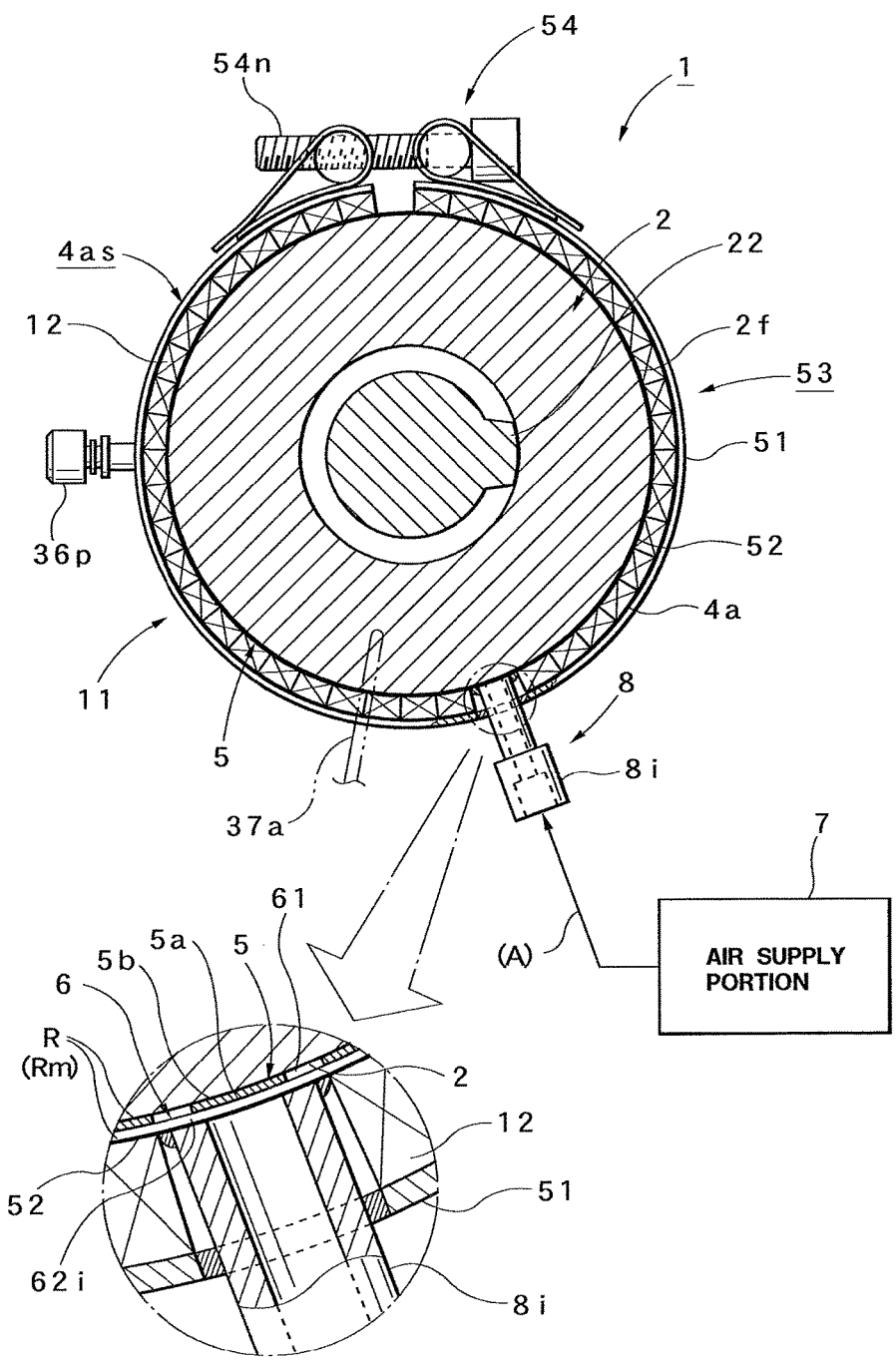
FIG. 1: A cross-sectional front view of a heating cylinder of an injection molding machine including a heating device according to a preferred embodiment of this invention.
Figure 6:
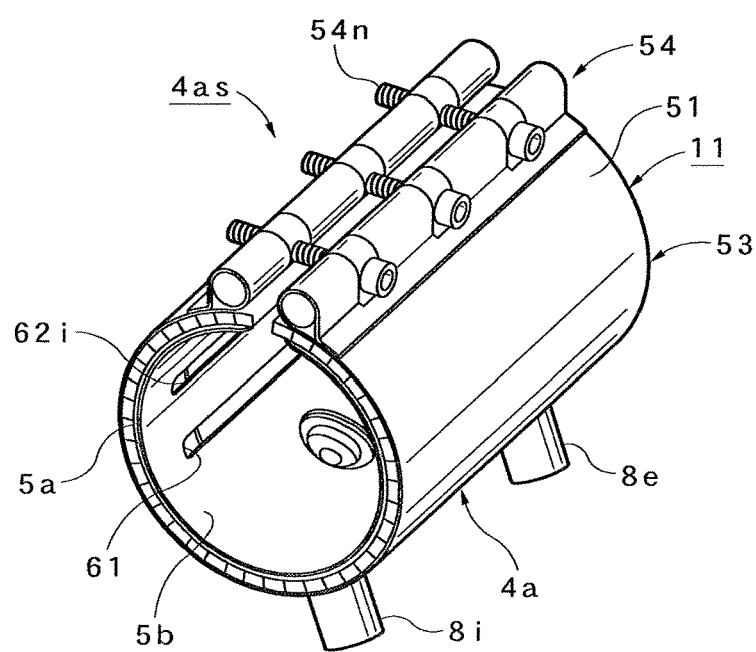
FIG. 6: An external perspective view of the heating device.

Furthermore, the air outlet and inlet portion 8 is formed with an air inlet portion 8i and an air outlet portion 8e. As shown in FIG. 6, the air inlet portion 8i and the air outlet portion 8e are pipe-type joints, and as shown in FIG. 1, the outer panel portion 51 or the inner panel portion 52 of the band-shaped member 53 is fixed, and thus an inner end is made to face the same inner circumferential surface of the inner panel portion 52. Here, as shown in FIG. 7, the assembly position of the first panel member 5a and the second panel member 5b is selected such that the air inlet portion 8i communicates with the slit 62i on one side, and that the air outlet portion 8e communicates with the slit 62e on the other side.

Hence, the heating device 1 having the structure described above and according to this embodiment can be easily assembled as follows.

The band heater 11 in a state where the coupling screws 54n of the coupling portion 54 are removed is first prepared. Then, the inner panel portion 52 of the band-shaped member 53 in the band heater 11 is faced upward, the first panel member 5a is placed on the upper surface of the inner panel portion 52 so as to overlaid thereon and furthermore, the second panel member 5b is placed on the upper surface of the first panel member 5a so as to be overlaid thereon.

Then, the band-shaped member 53 in this state is wound on the outer circumferential surface 2f of the front portion of the heating cylinder 2 such that the second panel member 5b makes contact with the outer circumferential surface 2f of the heating cylinder 2, and both ends in the longitudinal direction of the wound band-shaped member 53 are coupled with the coupling screws 54n. Since in this case, the attachment is substantially the same as the attachment of the normal band heater 11, it is possible to easily perform the attachment. Here, the amount of rotation of the coupling screws 54n is varied, the magnitude (the absolute magnitude and the relative magnitude in the position in the axial direction) of the tightening strength is adjusted and the relative positions of the first panel member 5a and the 5b with respect to the band heater 11 are adjusted.

Figure 3:
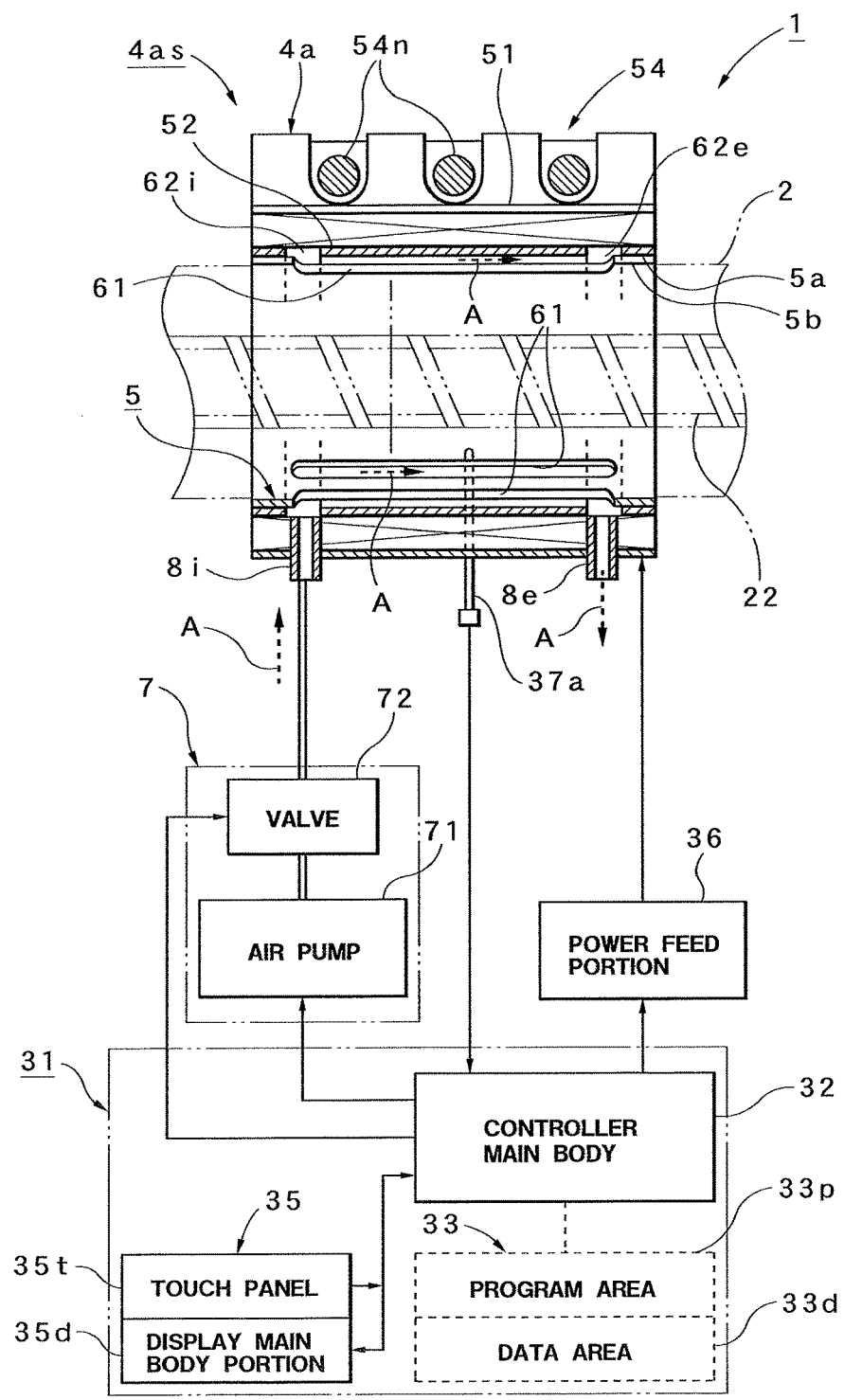
FIG. 3: A block system diagram showing the control system of the heating device.

In this way, the attachment of the band heater 11 to the circumferential surface 2f of the heating cylinder 2 in which the panel member 5 formed with the first panel member 5a and the second panel member 5b is interposed is completed, and thus the heating device 1 shown in FIG. 6 is formed. Then, as shown in FIG. 3, the connection is made such that the air A can be supplied to the air inlet portion 8i from the air supply portion 7, and the air outlet portion 8e remains in the opened state. An exhaust pipe may be connected to the air outlet portion 8e so that the exhaust position and the exhaust direction are changed. In this case, since the air supply portion 7 includes an air pump 71 and a valve 72, the air discharge port of the air pump 71 is connected to the air inlet portion 8i through a pipe along which the valve 72 is connected halfway. As the air pump 71, a common air pump installed in factory facilities can be used.

Although only the method of attaching the air cooling-capable heater 4as is described above, the same attachment as the above-described method of attaching the air cooling-capable heater 4as can be performed on the other air cooling-capable heaters, that is, the air cooling-capable heater 4bs which is attached to an intermediate portion of the heating cylinder 2 and the air cooling-capable heater 4cs which is attached to the back portion of the heating cylinder 2.

The configuration of a drive control system related to the heating device 1 according to this embodiment will then be described with reference to FIGS. 1 to 7.

The injection molding machine M includes a molding machine controller 31 shown in FIG. 2. As shown in FIG. 3, basically, the molding machine controller 31 includes a controller main body 32 incorporating hardware such as a CPU and an internal memory 33 such as hard disc controlled by the controller main body 32. Hence, the molding machine controller 31 is formed as a computer system, and has the function of controlling the entire injection molding machine M.

In this case, the internal memory 33 has a data area 33d where various types of data can be written and a program area 33p where various types of programs can be stored. In the program area 33p, a PLC program and a HMI program are stored, and various types of processing programs for performing various types of computation processing and various types of control processing (sequence control) are also stored. Hence, the processing programs stored include a sequence control program related to the temperature control for making the heating device 1 of this embodiment function. The PLC program is software for realizing sequence operations in various types of steps in the injection molding machine M, the monitoring of the injection molding machine M and the like, and the HMI program is software for realizing the setting and display of the operation parameters of the injection molding machine M, the display of operation monitoring data on the injection molding machine M and the like. On the other hand, a display 35 is connected to the molding machine controller 31. The display 35 is formed with a display main body portion 35d that performs various types of display and a touch panel portion 35t that is provided in the display main body portion 35d to perform various types of input.

On the other hand, as shown in FIG. 3, the band heater 11 of the air cooling-capable heater 4as is connected to a power feed portion 36. Reference numeral 36p in FIG. 1 represents a connection terminal for the power feed portion 36 of the band heater 11. A heating control signal is fed to the power feed portion 36 from the molding machine controller 31. A cooling control signal is fed to the air pump 71 and the valve 72 described previously from the molding machine controller 31. Furthermore, in the heating cylinder 2, a temperature sensor 37a is provided that uses a thermocouple to which the band heater 11 is attached and which detects the temperature of the metering zone Zm. In this case, the temperature sensor 37a is fitted by being inserted into a fitting hole formed in the outer circumferential surface 2f of the heating cylinder 2. Then, the result of the detection of the temperature sensor 37a is fed to the molding machine controller 31.

Although the drive control system of the air cooling-capable heater 4as is described above, the other air cooling-capable heaters 4bs and 4cs are configured (connected) in the same manner. Since each of the heaters 4n and 4d uses only the band heater 11, they are connected to the power feed portion 36. FIG. 2 shows the entire connection system in the injection molding machine M (the injection device Mi). In FIG. 2, reference numeral 37n represents a temperature sensor that detects the temperature of the nozzle zone (the injection nozzle 3), reference numeral 37b represents a temperature sensor that detects the temperature of the compression zone Zc in the heating cylinder 2, reference numeral 37c represents a temperature sensor that detects the temperature of the feeding zone Zf in the heating cylinder 2 and reference numeral 37d represents a temperature sensor that detects the temperature of the final portion of the heating cylinder 2.

The entire function (action) of the heating device 1 including the operation of the drive control system related to the heating device 1 according to this embodiment will then be described with reference to FIGS. 1 to 7.

Although the operation of the air cooling-capable heater 4as will be described as an example, the other air cooling-capable heaters 4bs and 4cs perform the same operation except that the setting temperatures are different. The heaters 4n and 4d perform an operation only at the time of heating, and perform a normal heating operation except that the setting temperatures are different.

In a heating mode, the heating control signal is fed from the molding machine controller 31 to the power feed portion 36. The valve 72 is off (closed). Thus, the band heater 11 of the air cooling-capable heater 4as generates heat. Then, the heat generated is transmitted through the panel member 5 where the first panel member 5a and the second panel member 5b are overlaid to the heating cylinder 2, and the front portion (the metering zone Zm) of the heating cylinder 2 is heated. Although in this case, the panel member 5 is interposed between the band heater 11 and the heating cylinder 2, in the case of the example, the two stainless plates having a thickness of about 2 mm and thermal conductivity are interposed, and the air path 6 obtained by being partially punched is present in the stainless plates, with the result that thermal loss is little produced.

On the other hand, when the temperature of the heating cylinder 2 is increased close to the setting temperature, according to the sequence control program in the molding machine controller 31, the supply of the heating control signal to the power feed portion 36 is cancelled (turned off), and simultaneously, the cooling control signal is fed from the molding machine controller 31 to the valve 72. In this way, the valve 72 is turned from off to on (open), and the mode is conducted to a cooling mode.

In the cooling mode, the air A is supplied from the air pump 71 and is passed from the air inlet portion 8i into the air path 6. Then, the air A is passed through the air path 6 and is passed out from the air outlet portion 8e to the outside (the atmosphere). In this case, the air A from the air inlet portion 8i is passed into the slit 62i formed in the first panel member 5a and is passed into the slits 61 from the one ends of the eight slits 61 formed in the second panel member 5b. Then, the air A passed through the slits 61 reaches the other ends of the slits 61 and is passed into the slit 62e formed in the second panel member 5b, and the air A within the slit 62e is passed out from the air outlet portion 8e to the outside. The flow of the air A here is indicated by dotted arrows in FIG. 3, and is also indicated by double-dashed arrows in FIG. 7. In this way, since the air A passed through the air path 6, in particular, passed through the slits 61 makes contact with the outer circumferential surface 2f of the heating cylinder 2, heat exchange with the heated outer circumferential surface 2f is performed, and thus the outer circumferential surface 2f is forcibly cooled (air-cooled).

Incidentally, the air cooling-capable heaters 4as, 4bs and 4cs are applied to at least one or two or more the heaters 4a, 4b and 4c which heat the metering zone Zm, the compression zone Zc and the feeding zone Zf. These zones Zm, Zc and Zf are zones that produce an unnecessary temperature increased caused by shear heat when the resin material is sheared by the rotation of the screw 22. Hence, when the power feed to the band heater 11 is cancelled and natural cooling is depended on without forced cooling being performed, a heating temperature is more likely to become unstable by overshooting or the like. Thus, the power feed to the band heater 11 in the air cooling-capable heaters 4as, 4bs and 4cs is cancelled, and the forced cooling of an air-cooling system is performed. In this way, as described previously, it is possible to realize satisfactory temperature control and to contribute to further enhancement of molding quality.

Hence, in the heating device 1 of the injection molding machine M according to the embodiment described above, since the air cooling-capable heaters 4as, . . . are provided in which the panel member 5 formed of the material R (the thermally conductive metal material Rm) having thermal conductivity is interposed between the heaters 4a, . . . and the heating cylinder 2, in which in the panel member 5, the air path 6 for air cooling is formed and in which in the air path 6, the air outlet and inlet portion 8 allowing the air A to be passed from the external air supply portion 7 is provided, the heating structure of the heater 4a is hardly sacrificed. Hence, it is possible to minimize a decrease in heat loss (heating efficiency) and furthermore, a decrease in the responsiveness of the temperature control and a decrease in controllability, and thus it is possible to sufficiently achieve both the heating function and the cooling (air-cooling) function. Even when a cooling structure is added to the heater 4a provided on the outer circumferential surface 2f of the heating cylinder 2, since it is not necessary to change the outside diameter of the heater 4a, it is possible to avoid a failure in which the side of the heating cylinder 2 and hence the injection molding machine M is increased. In other words, even when a cooling structure is added to the already provided heating structure, it is possible to avoid a failure in which the size of a molding facility is uselessly increased and the space efficiency is lowered.

A heating device 1 according to a variation of this invention will then be described with reference to FIGS. 8 and 9.

Figure 8:
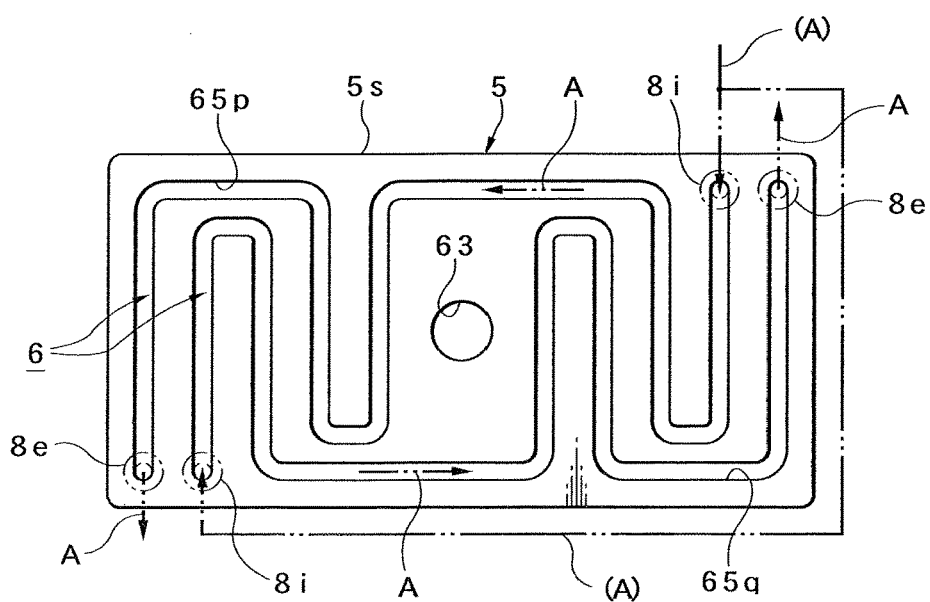
FIG. 8: A development view showing a state where the panel member included in the heating device according to a variation of this invention is unfolded.

A variation shown in FIG. 8 is a variation of the panel member 5, and the panel member 5 is formed with one panel member 5s. Hence, the variation differs in this point from the embodiments of FIGS. 1 to 7 using the panel member 5 in which the first panel member 5a and the second panel member 5b are combined. As described above, the panel members 5s, 5a, . . . of the panel member 5 may be formed with one panel member 5s or may be formed with a combination of the two panel members 5a and 5b. Furthermore, as necessary, the panel member 5 may be formed with a structure in which three panel members are overlaid, and the number of panel members 5s, 5a, . . . used is not limited. In the variation shown in FIG. 8, one panel member 5s is used, and in the case of the example, the slits 65p and 65q of two systems are formed in one panel member 5s, and air paths 6 are provided in which the air A can be passed in from the end portions of the slits 65p and 65q on the opposite sides. In FIG. 8, the same parts as in FIG. 7 are identified with the same symbols, and thus the configuration thereof is clarified and the detailed description thereof will be omitted.

Figure 9:
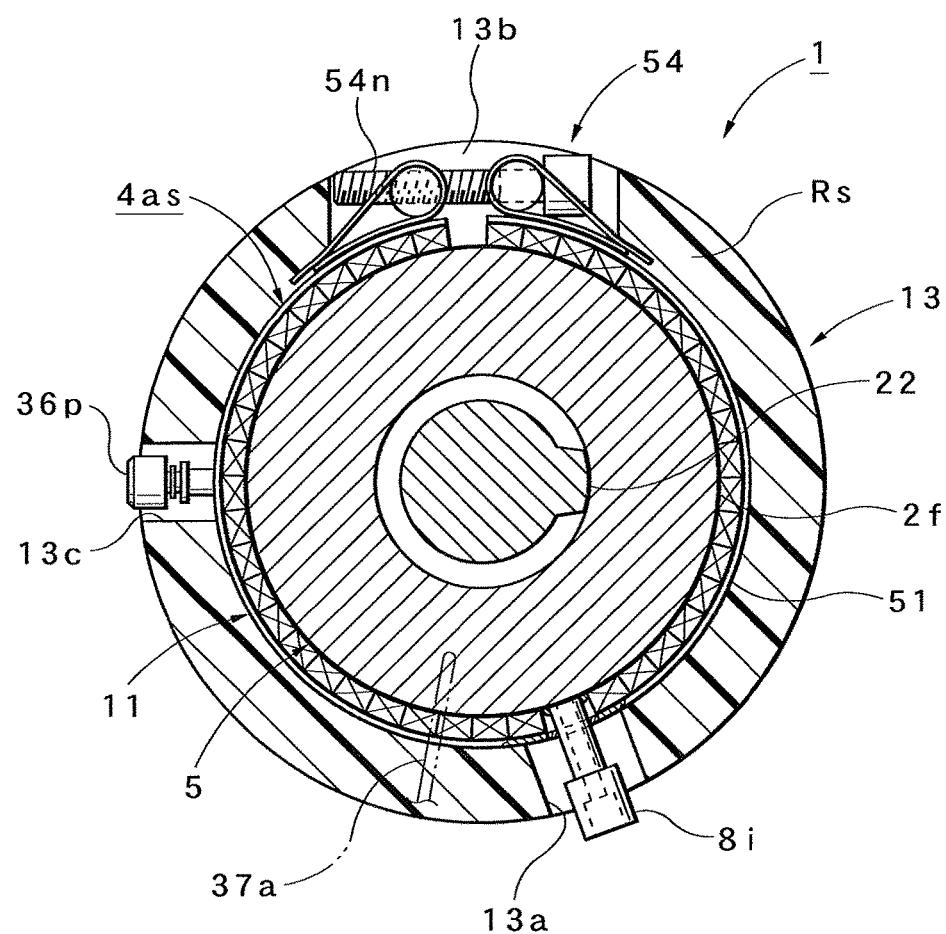
FIG. 9: A cross-sectional front view of a heating cylinder of an injection molding machine including a heating device according to another variation of this invention.

In a variation shown in FIG. 9, on the outer circumferential surface of the air cooling-capable heater 4as, a heat retention cover 13 using a heat insulation material Rs is provided. As the heat insulation material Rs, a material such as a urethane foam resin that has a high heat insulation property is used, and the entire material is formed in the shape of a cylinder to cover substantially the entire outer circumferential surface of the air cooling-capable heater 4as.

In this way, it is possible to sufficiently achieve the original purpose of the heat retention cover 13. Specifically, although in general, the heat retention cover 13 is prepared, for example, as an option or the like so as to retain the heat of the heating cylinder 2 and thereby enhance energy saving, since a negative effect such as the lowering of controllability of a cooling direction is produced, some users do not adopt the heat retention cover 13 or remove the heat retention cover 13 after it is fitted. However, since the air cooling-capable heaters 4as, 4bs and 4cs of this invention are adopted, and thus it is possible to remove the negative effect caused by the heat retention cover 13, the effectiveness of the heat retention cover 13 is achieved, with the result that it is possible to enhance energy saving.

Although the air cooling-capable heater 4as is described above, the same heat retention cover 13 can be added to the other air cooling-capable heaters 4bs and 4cs and furthermore the heaters 4n and 4d. Reference numerals 13a, 13b and 13c represent the opening portions of the heat retention cover 13 for holding protrusion portions on the outer circumferential surface of the air cooling-capable heater 4as.

Although the preferred embodiments (the variations) are described above in detail, this invention is not limited to such embodiments, and a change, an addition and a deletion can be arbitrarily made on the detailed configuration, the shape, the material, the number, the value and the like without departing from the spirit of this invention.

For example, although in the embodiments, the example where the heating device 1 includes five heaters 4n, 4a, 4b, 4c and 4d is described, the heating device 1 may include four or less of heaters or six or more of heaters. Although in the embodiments, the example where the three air cooling-capable heaters 4as, 4bs and 4cs are provided is described, the air cooling-capable heater may be applied to only one or two heaters especially necessary to have a cooling property or the other heaters 4n and 4d may be formed with the same air cooling-capable heater. On the other hand, although preferably, each of the heaters 4n, 4a, . . . incorporates the heating member 12 therewith, and the band heater 11 fitted by being wound on the outer circumferential surfaces 2f and 3f of the heating cylinder 2 and/or the injection nozzle 3 is used, the invention is not necessarily limited to the band heater 11. However, as the type of heater, a heating type in which the heating cylinder 2 is heated by a thermally conductive system is preferable. Although the example where as the air path 6, the slit formed by being punched in the panel members 5a, 5b, . . . is used is described above, this example does not prevent a case where the air path 6 is formed with a channel whose cross section is a concave groove from being adopted. Hence, in this case, the panel member 5 can be formed with one panel member. Furthermore, in this case, it is possible to directly form the air path 6 on the surface of the inner panel portion 52 forming the band heater 11 without separately preparing the panel member. Furthermore, in the case of the band heater 11 including the inner panel portion 52, the panel member 5 in which the inner panel portion 52 and other two (in general, a plurality of) panel members are combined may be formed. This invention can also be applied to the band heater 11 (the heater 4a) where the inner panel portion 52 is not provided.

INDUSTRIAL APPLICABILITY

The heating device according to this invention can be utilized for various types of injection molding machines including a heater that is provided on the outer circumferential surface of a heating cylinder or the like to heat the heating cylinder or the like.

REFERENCE SIGNS LIST

1: heating device, 2: heating cylinder, 2f: outer circumferential surface of heating cylinder, 3: injection nozzle, 3f: outer circumferential surface of injection nozzle, 4n: heater, 4a: heater, 4b: heater, 4c: heater, 4d: heater, 4as: air cooling-capable heater, 4bs: air cooling-capable heater, 4cs: air cooling-capable heater, 5: panel member, 5s: panel member, 5a: panel member, 5b: panel member, : air path, 7: air supply portion, 8: air outlet and inlet portion, 11: band heater, 12: heating member, 13: heat retention cover, A: air, M: injection molding machine, R: material having thermal conductivity, Rm: thermally conductive metal material, Rs: heat insulation material, Zm: metering zone, Zc: compression zone, Zf: feeding zone

CITATION LIST

Patent Literature 1

Japanese Utility Model Registration No. 3007990

Patent Literature 2

JP-No. H11(1990)-115015

The invention claimed is:

1. A heating device of an injection molding machine, the heating device comprising:
   a plurality of heaters being sequentially provided along an axial direction on an outer circumferential surface of at least one of a heating cylinder and an injection nozzle to heat at least one of the heating cylinder and the injection nozzle;
   at least a first one of the plurality of heaters is positioned in a front portion and includes a first air cooling-capable heater;
   at least a second one of the plurality of heaters is positioned in an intermediate zone and includes a second air cooling-capable heater; and
   at least a third one of the plurality of heaters is positioned in a back portion and includes a third air cooling-capable heater;

wherein the first, second and third air cooling-capable heaters each includes one panel member, formed of a material having thermal conductivity, that is interposed between the part of at least the first, second and third heaters and the outer circumferential surface of at least one of the heating cylinder and the injection nozzle, in which each of the first, second and third air cooling-capable heaters includes an air path for air cooling that is formed as a respective slit punched in the panel member and in which each of the first, second and third cooling-capable heaters includes an air outlet and an air inlet that are in communication with the respective slit for allowing air to be passed from an air supply, wherein air is supplied from the air supply to each of the first, second and third air inlets and through the respective slit formed in the panel member and the air exits through the air outlet portion for cooling the heating device.

2. The heating device of an injection molding machine according to claim 1, wherein the at least a first one, a second one and a third one of the plurality of heaters are a band heater that is fitted by being wound on the outer circumferential surface of at least one of the heating cylinder and the injection nozzle.

3. The heating device of an injection molding machine according to claim 1, wherein the material having thermal conductivity is a thermally conductive metal material.

4. The heating device of an injection molding machine according to claim 1, wherein a thickness of the one panel member falls within a range of 0.5 to 2 mm.

5. The heating device of an injection molding machine according to claim 1, wherein the first air cooling-capable heater is applied to the at least the first one of the heaters that heats the front portion in the heating cylinder.

6. The heating device of an injection molding machine according to claim 5, wherein in the first air cooling-capable heater, a heat retention cover using a heat insulation material is provided on an outer circumferential surface.

7. The heating device of an injection molding machine according to claim 1, wherein the second air cooling-capable heater is applied to the at least the second one of the heaters that heats the intermediate portion in the heating cylinder.

8. The heating device of an injection molding machine according to claim 7, wherein in the second air cooling-capable heater, a heat retention cover using a heat insulation material is provided on an outer circumferential surface.

9. The heating device of an injection molding machine according to claim 1, wherein the third air cooling-capable heater is applied to the at least the third one of the heaters that heats the back portion in the heating cylinder.

10. The heating device of an injection molding machine according to claim 9, wherein in the third air cooling-capable heater, a heat retention cover using a heat insulation material is provided on an outer circumferential surface.

11. The heating device of an injection molding machine according to claim 1, wherein in each of the first, second and third air cooling-capable heaters, a heat retention cover using a heat insulation material is provided on an outer circumferential surface.

12. A heating device of an injection molding machine, the heating device comprising:
a plurality of heaters being sequentially provided along an axial direction on an outer circumferential surface of at least one of a heating cylinder and an injection nozzle to heat at least one of the heating cylinder and the injection nozzle;
at least a first one of the plurality of heaters is positioned in a front portion and includes a first air cooling-capable heater;
at least a second one of the plurality of heaters is positioned in an intermediate portion and includes a second air cooling-capable heater; and
at least a third one of the plurality of heaters is positioned in a back portion and includes a third air cooling-capable heater;
wherein the first, second and third air cooling-capable heaters each includes two or more panel members, formed of a material having thermal conductivity, that are between the part of at least the first, second and third heaters and the outer circumferential surface of at least one of the heating cylinder and the injection nozzle, in which each of the first, second and third air cooling-capable heaters includes an air path for air cooling that is formed as respective slits in the two or more panel members and in which each of the first, second and third cooling-capable heaters includes an air outlet and an air inlet that are in communication with the respective slits in the two or more panel members for allowing air to be passed from an air supply, wherein air is supplied from the air supply to each of the first, second and third air inlets and through the respective slits formed in the two or more panel members and the air exits through the air outlet portion for cooling the heating device.

13. The heating device of an injection molding machine according to claim 12, wherein a thickness of the two or more panel members falls within a range of 0.5 to 2 mm.

* * * * *